US012769517B2

(12) United States Patent
Ashok et al.

(10) Patent No.: US 12,769,517 B2
(45) Date of Patent: Oct. 20, 2026

(54) GENERATING MOCK DATA FOR APPLICATION PROGRAMMING INTERFACES

(71) Applicant: INTERNATIONAL BUSINESS MACHINES CORPORATION, Armonk, NY (US)

(72) Inventors: Aravind Ashok, Bengaluru (IN); Nageswararao Venkata Gokavarapu, Bangalore (IN); Ruthwik H M, Bangalore (IN); Anoop Khooli, Thalassery (IN)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 18/619,284

(22) Filed: Mar. 28, 2024

(65) Prior Publication Data

US 2025/0306863 A1 Oct. 2, 2025

(51) Int. Cl.
*G06F 8/30* (2018.01)
*H04L 67/02* (2022.01)

(52) U.S. Cl.
CPC ................ *G06F 8/31* (2013.01); *H04L 67/02* (2013.01)

(58) Field of Classification Search
CPC ................................... G06F 8/31; H04L 67/02
See application file for complete search history.

(56) References Cited

U.S. PATENT DOCUMENTS

| | | | | |
|---|---|---|---|---|
| 10,678,679 | B1 * | 6/2020 | Sonawale | G06F 11/3684 |
| 11,030,085 | B2 * | 6/2021 | Battaglia | G06F 9/547 |
| 12,393,470 | B2 * | 8/2025 | Srivastava | G06F 9/541 |
| 2004/0148612 | A1 * | 7/2004 | Olsen | G06F 40/143 707/E17.124 |
| 2017/0147479 | A1 * | 5/2017 | Boyter | G06F 11/3608 |
| 2020/0233786 | A1 * | 7/2020 | Battaglia | G06F 9/547 |
| 2020/0233787 | A1 * | 7/2020 | Battaglia | H04L 63/083 |
| 2020/0233789 | A1 * | 7/2020 | Battaglia | G06F 11/3688 |
| 2021/0034505 | A1 * | 2/2021 | Wackerly | G06F 16/27 |
| 2023/0083724 | A1 * | 3/2023 | Cella | G06F 16/24537 705/28 |

FOREIGN PATENT DOCUMENTS

CN 113342353 A 9/2021

OTHER PUBLICATIONS

Anonymous, "Providing Smart Mapping Suggestions for Language Structures to API Schema Fields", https://priorart.ip.com/IPCOM/000272168, Apr. 24, 2023, 6 pages.
Muzakki, "Method to Build Dynamic Mock System for gRPC API Based on Protocol Buffers", https://priorart.ip.com/IPCOM/000267109, Sep. 27, 2021, 6 pages.

(Continued)

*Primary Examiner* — Daxin Wu
(74) *Attorney, Agent, or Firm* — Seed Intellectual Property Law Group LLP

(57) ABSTRACT

A computer-implemented method may include identifying a language structure field and an API schema field; determining a determined language structure field associated with an API under test based on a mapping of the language structure field to the API schema field; and generating a mock data set based on the determined language structure field for testing the API under test.

20 Claims, 5 Drawing Sheets

(56) References Cited

OTHER PUBLICATIONS

Kathuria, "Unleashing GraphQL Type-Based Mocking", https://medium.com/@kathuria.saloni29/unleashing-graphql-type-based-mocking-d7968ae494d3, Oct. 10, 2023, 11 pages.
DuVander, "JSON Generator for Mock API Data", https://blog.stoplight.io/mock-json-generator, Apr. 3, 2019, 6 pages.
Anonymous, "Data Generator", https://support.smartbear.com/readyapi/docs/testing/data-driven/types/generator/index.html?sbsearch=Data%20Generator, Jan. 15, 2024, 2 pages.
Anonymous, "Random Data Generator and API Mocking Tool", https://www.mockaroo.com/, Page Accessed Feb. 14, 2024, 3 pages.
Anonymous, "IBM DevOps Test Virtualization", https://www.ibm.com/products/devops-test/virtualization?utm_content=SRCWW&p1=Search&p4=43700079278200139&p5=e&gad_source=1&gclid=EAlalQobChMI0K6t0piShQMVXkdHAR3E-gvDEAAYASAAEgLE_D_BwE&gclsrc=aw.ds, Page Accessed Feb. 14, 2024, 5 pages.
No Author, "ReadyAPI", https://web.archive.org/web/20231210101359/https://smartbear.com/product/ready-api/api-functional-testing/, Dec. 10, 2023, 5 pages.

* cited by examiner

GENERATING MOCK DATA FOR APPLICATION PROGRAMMING INTERFACES

BACKGROUND

Aspects of the present invention relate generally to generating mock data sets for application programming interface (API) testing. API integration applications may fetch data from a subsystem and provide a means for developers or other users or systems to access and retrieve data. Subsystems may include language structures that provide a list of data fields present in a data request or response. Creating an API using an API integration tool may include testing of the connection to subsystems to receive requests and send responses relating to data. Testing APIs may utilize a development environment and corresponding mock data to simulate API usage.

SUMMARY

In a first aspect of the invention, there is a computer-implemented method including: identifying a language structure field and an API schema field; determining a determined language structure field associated with an API under test based on a mapping of the language structure field to the API schema field; and generating a mock data set based on the determined language structure field for testing the API under test.

In another aspect of the invention, there is a computer program product including one or more computer readable storage media having program instructions collectively stored on the one or more computer readable storage media. The program instructions are executable to: identify a language structure field and an API schema field; determine a determined language structure field associated with an API under test based on a mapping of the language structure field to the API schema field; and generate a mock data set based on the determined language structure field for testing the API under test.

In another aspect of the invention, there is a system including a processor set, one or more computer readable storage media, and program instructions collectively stored on the one or more computer readable storage media. The program instructions are executable to: identify a language structure field and an API schema field; determine a determined language structure field associated with an API under test based on a mapping of the language structure field to the API schema field; and generate a mock data set based on the determined language structure field for testing the API under test.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
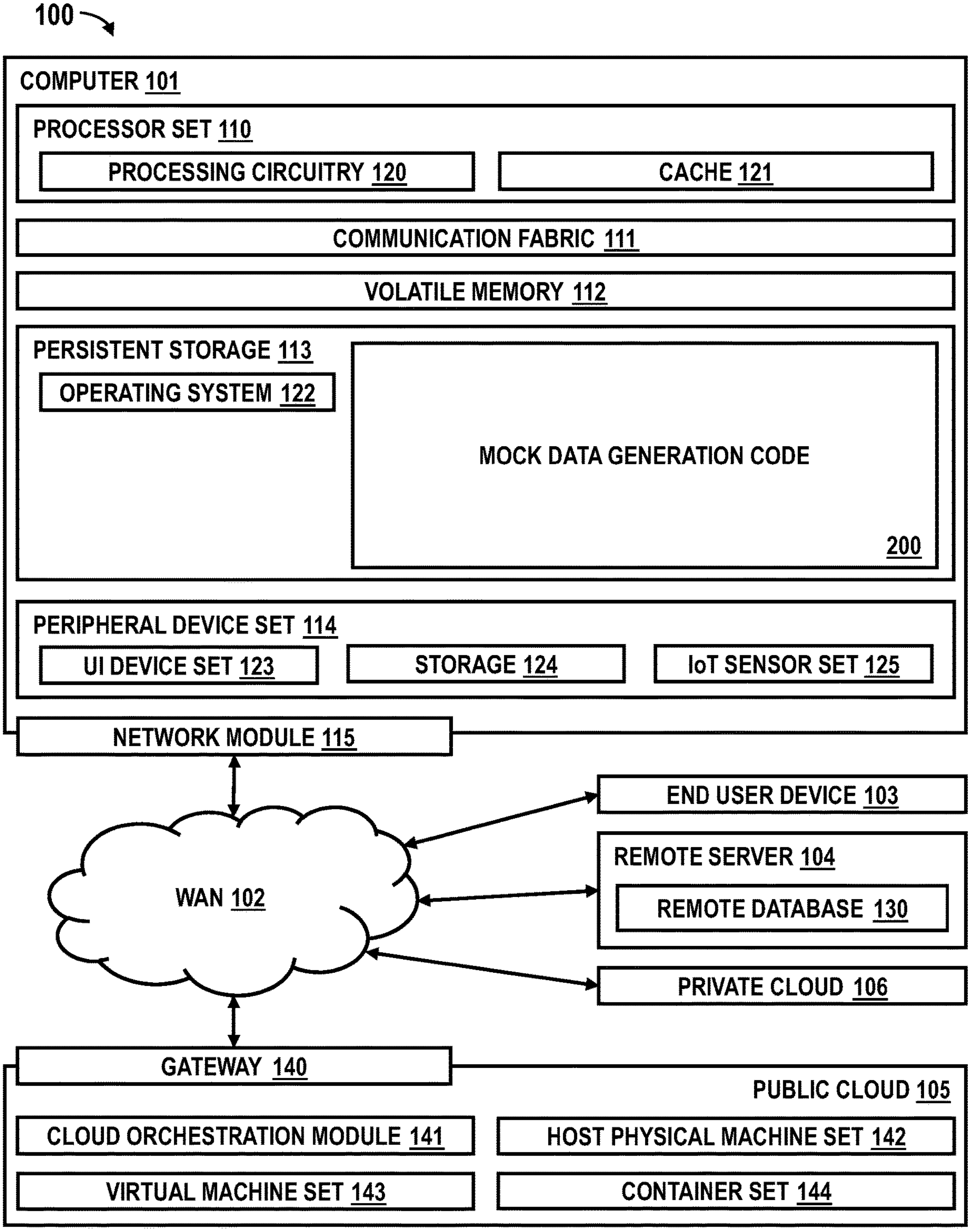
FIG. 1 depicts a computing environment according to an embodiment of the present invention.

Aspects of the present invention relate generally to generating mock data for API testing and, more particularly, to a system including a mapped data field identification module for generating a mock data set. According to aspects of the invention, the system may include a mapped data field identification module configured to identify and store relevant data fields according to mappings per API operation. The mapped data field identification module may also be configured to identify relevant value ranges for data fields associated with individual API operations. In embodiments, the system may include an intelligence module configured to communicate the identified and stored relevant data fields to a determined language structure field within a mock data set based on the mapping of the mappings per API operation. In embodiments, the system may generate a mock data set based on the determined language structure field. In this manner, implementations of the invention identify and store relevant data fields based on mappings per API operation, communicate relevant data fields to a determined language structure field, and generate mock data limited to the determined language structure field.

APIs may require testing as well as connection to subsystems to receive requests and send responses relating to data, prior to using an API in real-world applications. Testing APIs may require a development environment and corresponding test data to improve reliability, functionality, etc. Testing APIs typically requires a number of setup arrangements to test a multitude of API variables, situations, etc. API testing may be a costly process in terms of time and resources, particularly when using large volumes of mock data. Additionally, API testing may encounter interference when running tests simultaneously, for example, testing an API operation such as a POST or GET request from the same resource within the database. This interference may be further complicated based on the API interaction commands being made, such as POST, GET, PUT, DELETE, PATCH, etc. Additionally, when requesting data from a subsystem, not all data fields from an API may be required in order to send a request. Similarly, not all data fields communicated back from the subsystem may be required in the response of a particular API request being executed. Therefore, generating mock data for an API under test advantageously should not include generating mock data for unused data fields during a particular test. Generating mock data via an external mock data generator may not have access to the specific data fields required during an API test, and superfluous mock data may be generated unnecessarily in an attempt to generate mock data for all data fields rather than the specific data fields required during an API test. This may result in unnecessary time and computing resources spent generating unnecessary mock data. Various embodiments address this issue by providing a method, system, and computer program product that are configured to use automated processes to generate mock data for testing an API where the mock data that is generated includes only those available data fields that are used by the API and does not include available data fields that are not used by the API. In this manner, the method, system, and computer program product generate tailored mock data sets for individual API testing. Tailoring the generation of mock data for API testing in this manner reduces or eliminates unnecessary time and computing resources spent generating unnecessary mock data for data fields that are not used by the API being tested, and this constitutes an improvement in the technical field of API testing.

According to embodiments, a method for generating a mock data set for testing API operations and an API integration application may include: identifying language structure fields and API schema fields to be used for mapping the API operations; determining language structure fields of the mock data set based on the map of the identified language structure fields and the API schema fields of each API operation so that the language structure fields are reduced for the mock data set; and generating the mock data set with the determined language structure fields.

According to embodiments, a method for generating a mock data set for testing API operations and an API integration application may include determining API schema fields of the mapped data set based on the map of the identified language structure fields and the API schema fields of each API operation so that the API schema fields are reduced for the mock data set.

According to embodiments, a method for generating a mock data set for testing API operations and an API integration application may include a mapped field identification module having language structure fields mapped to API schema fields of API operations in an API integration application and an intelligence module configured to provide relevant data fields to a mock data generator to reduce the language structure fields and/or API schema fields for a mock data set.

According to embodiments, the system may include a mapped field identification module configured to monitor the mapping of language structure fields and API schema fields to one another. Individual API operations may include sets of language structure fields and API schema fields mapped to one another while excluding other language structure fields and API schema fields not relevant for an API operation. That is, individual API operations may include different sets of mapped language structure fields and API schema fields with respect to other API operations. In other cases, multiple API operations may use similar or identical language structure fields and API schema fields mapped to one another. According to embodiments, the system may be configured to: identify corresponding matching language structure fields and API schema fields; determine determined language structure fields based on a mapping of the language structure field to the API schema field; and generate a mock data set based on the determined language structure field in order to reduce superfluous mock data being generated or communicated between API integration applications and subsystems, thereby reducing computing resources and time required to test APIs and reducing the number of variations of mock data that would need to be generated without comprising testing of APIs. In this manner, the system may generate tailored mock data sets for individual API operations.

Implementations of the invention are necessarily rooted in computer technology. For example, the step of generating a mock data set, such as via data synthesis performed by a generative adversarial network (GAN), based on the determined language structure field is computer-based and cannot be performed in the human mind. Data synthesis performed by a GAN may include a deep learning model including a generator model and a discriminator model. Data synthesis in GANs is achieved through a process of adversarial training, where the generator learns to produce synthetic data samples by mimicking the distribution of real data, while the discriminator learns to distinguish between real and synthetic data samples. If the discriminator model is unable to distinguish between real and synthetic data samples, mock data may be generated imitating real-world data. GANs may include generating vast numbers of synthetic data samples and performing vast quantities of calculations to discriminate between real and synthetic data samples. Given the scale and complexity of a GAN and its corresponding data, it is simply not possible for the human mind, or for a person using pen and paper, to perform the number of calculations involved in training and/or using a GAN.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as mock data generation code of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
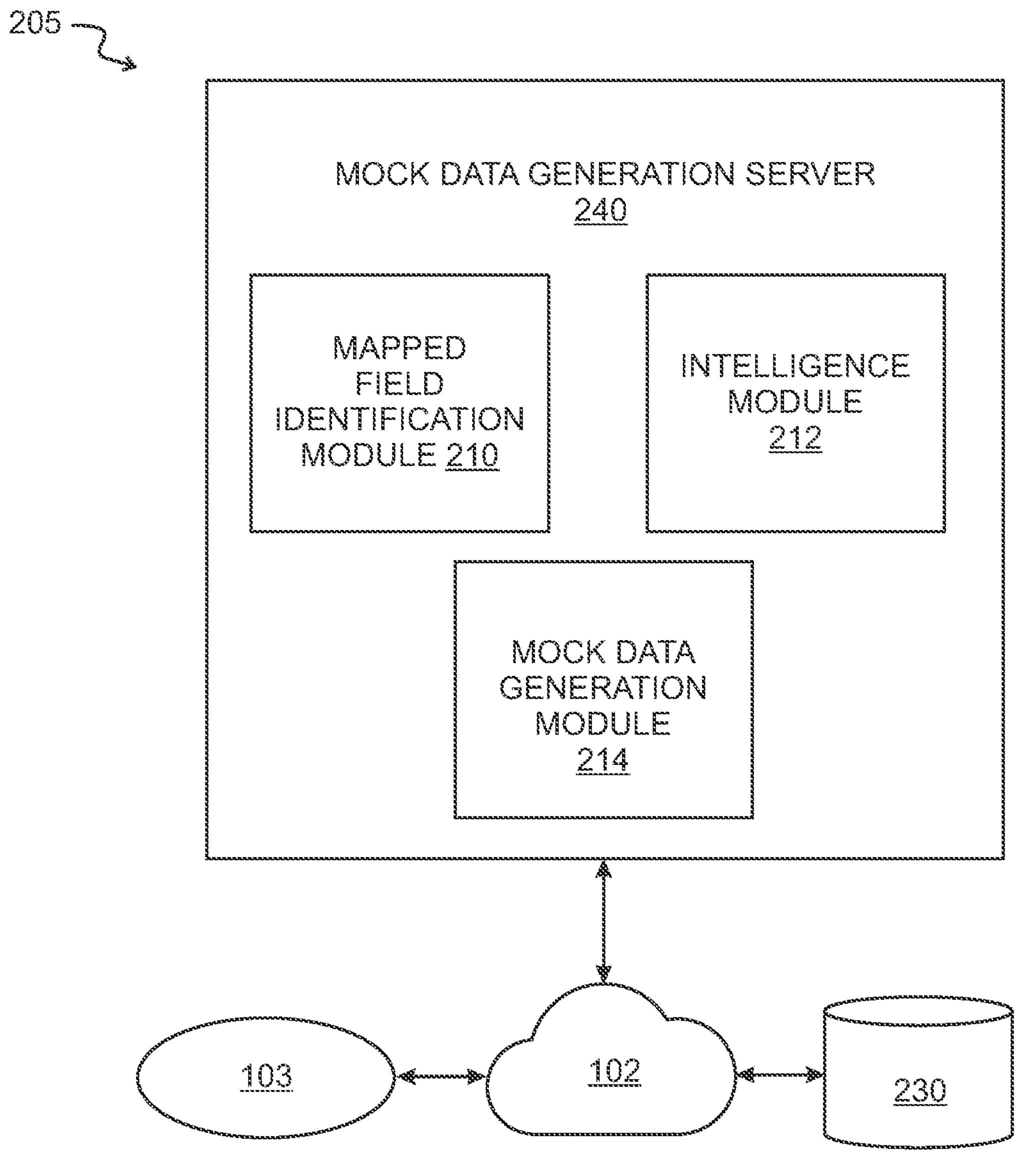
FIG. 2 shows a block diagram of an exemplary environment in accordance with aspects of the present invention.

FIG. 2 shows a block diagram of an exemplary environment 205 in accordance with aspects of the invention. In embodiments, the environment 205 includes mock data generation server 240, corresponding to computer 101 of FIG. 1, including or in operable communication with a mapped field identification module 210, an intelligence module 212, and a mock data generation module 214, collectively corresponding to mock data generation code of block 200, as in FIG. 1. The mapped field identification module 210 may be configured to identify language structure fields and API schema fields relevant to individual API operations. The mapped field identification module 210 may be configured to determine the language structure fields (determined language structure fields) of a mock data set based on a mapping of the identified language structure fields and the API schema fields of individual API operations. The intelligence module 212 may be configured to store and communicate decided language structure fields from the mapped field identification module 210 to the mock data generation module 214. The mock data generation module 214 may be configured to generate a mock data set with the determined language structure fields. In embodiments, the environment 205 includes a database 230 in operable communication with the mock data generation server 240 and the intelligence module 212 over WAN 102 corresponding to WAN 102 of FIG. 1. The database 230, corresponding to remote server 104 or remote database 130 of FIG. 1, may store data imported into the system such as API schema fields, language structure fields, and determined language structure fields. In embodiments, the environment 205 includes EUD 103, corresponding to EUD 103 of FIG. 1, which may be in operable communication with the mock data generation server 240. EUD 103 may be used, for example, in the mapping of API schema to language structures.

In embodiments, the mapped field identification module 210, the intelligence module 212, and the mock data generation module 214 each include one or more modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The mock data generation server 240 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Figure 3:
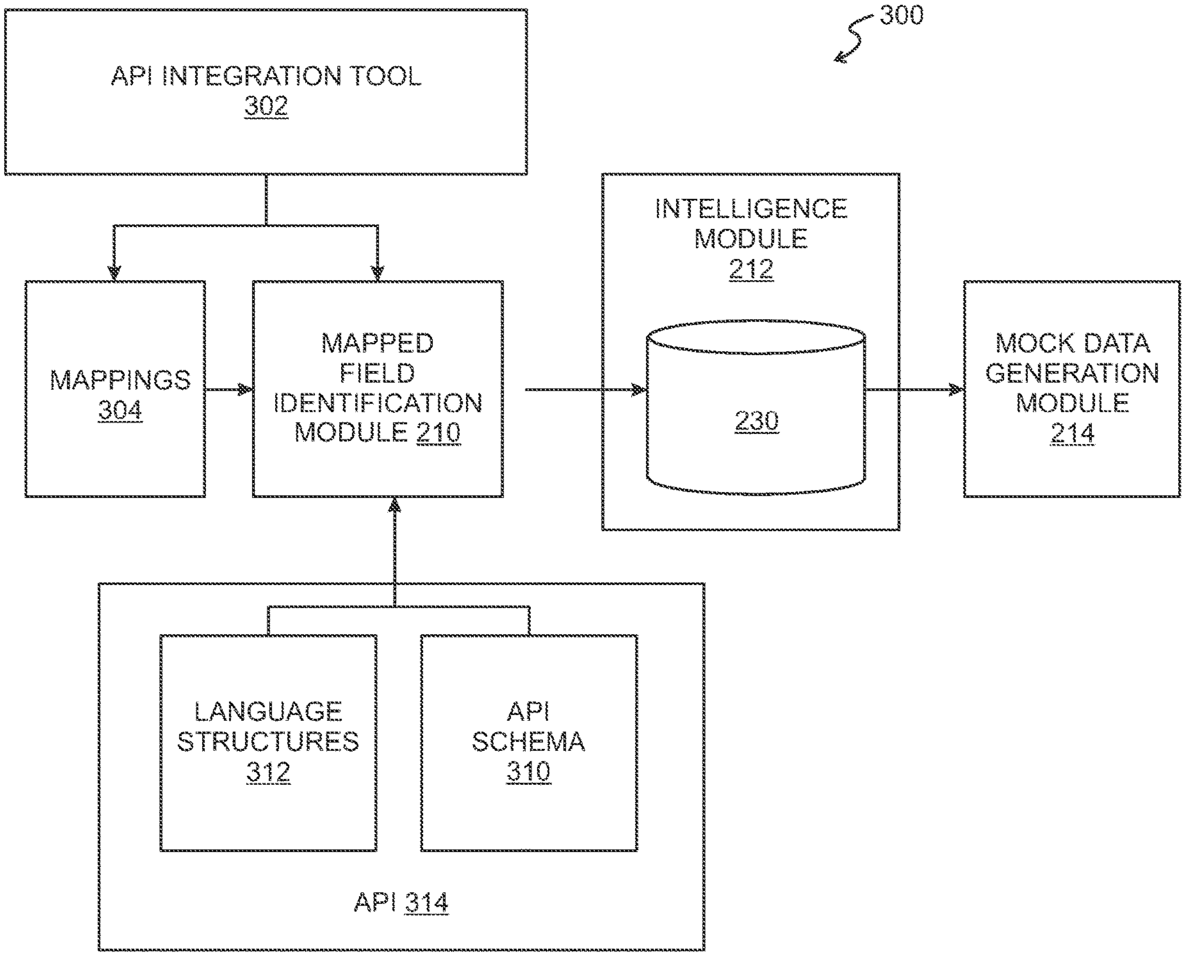
FIG. 3 shows a block diagram of an exemplary environment in accordance with aspects of the present invention.

FIG. 3 shows a block diagram of an exemplary environment 300 in accordance with aspects of the invention. An API integration tool 302 may be in operable communication with the mapped field identification module 210. The API integration tool 302 may be a software application accessible via the EUD 103 of FIGS. 1 and 2 configured to provide a user interface for configuring and managing integration between various software services and APIs. In embodiments, the API integration tool 302 may be configured to facilitate testing of connections between systems and subsystems to receive requests and send responses relating to data during API operations. In embodiments, the API integration tool 302 may be configured to monitor the mapping of language structure fields to API schema fields via the mapped field identification module 210. Monitoring the mapping of language structure fields to API schema fields may include tracking and logging mapping activities relating to which language structure fields have been mapped to API schema fields. For example, monitoring may include tracking and logging access, usage, events, system configuration settings, or activity performed via the API integration tool 302. Monitoring may also include identifying an API operation associated with the language structure field or the API schema field based on correlating the language structure field and the API schema field to known API operations requiring the language structure field or the API schema field.

The mapped field identification module 210, corresponding to the mapped field identification module 210 of FIG. 2, may identify a language structure field from language structures 312 and an API schema field from API schema 310. APIs may include language structures 312 that define how an API 314 organizes data, including application functions, data types, and data syntax. APIs may include API schema 310, which defines the structure, methods, parameters, and other details of API 314, including how the API 314 is used and API 314 inputs and outputs. The mapped field identification module 210 may also be configured to monitor mapping of language structure fields from language structures 312 and API schema fields from API schema 310 to identify API operations associated with language structures 312 and API schema 310. The mapped field identification module 210 may compare API operations to language structure fields mapped to schema fields to identify similarities. For example, API schema 310 may have corresponding API schema fields. Language structure fields that are mapped to API schema fields may indicate the API operation associated with the API schema fields. In this manner, embodiments are configured to identify an API operation associated with the language structure field and the API schema field.

In embodiments, identifying the language structure field and the API schema field API may include tracking and logging which of the language structure fields have been mapped to the API schema fields, or vice versa. In this manner, identifying the language structure field and the API schema field may be based on mappings 304 of API schema 310 to language structures 312. API schema fields, such as item identification, count, price, or description may be mapped to language structure fields such as item identification, count, price, or description. Mapping may include integrating data from multiple sources, such as language structure fields and schema fields, into a single or unified data set by associating fields with specific attributes or shared or similar characteristics. Mapping may include aligning or merging data structures, such as language structure fields and API schema fields, and resolving inconsistencies between data sets. Mapping may also include transforming language structure fields and schema fields into similar or identical formats. In this manner, embodiments may be configured to map a first language structure field to a first API schema field to determine a set of determined language structure fields for an API under test. In embodiments, mapping of API schema 310 to language structures 312 may include excluding the mapping of language structure fields not required by an API schema field corresponding to a particular API 314 operation to determine the set of determined language structure fields.

Similarly, embodiments are configured to exclude a second language structure field and a second API schema field from a determined language structure field of an API under test. In this manner, embodiments are configured to identify a first language structure field and a first API schema field of an API operation. Similarly, embodiments are also configured to identify a first language structure field from a plurality of language structure fields and identify a first API schema field from a plurality of API schema fields, wherein the plurality of language structure fields and the plurality of API schema fields are associated with an API operation, and which may be stored in database 230. In embodiments, determined language structure fields may be identified for a mock data set based on the mapping of the mappings per API 314 operation. That is, embodiments may be configured to determine a determined language structure field for an API under test based on the mapping of a first language structure field to a first API schema field.

Determining the determined language structure field may include extracting data from language structures and API schema such as by querying language structure and API schema databases, scraping via automated scripts, or API extraction. In some embodiments, determining the determined language structure field may include data extraction, transformation, and loading (ETL) processes. Determining the determined language structure field may include identifying which language structure fields have been mapped to schema fields, or vice versa, per individual API 314 operation and compiling data fields matching those of the language structure fields that have been mapped to schema fields or vice versa. Determined language structure fields may be compiled, for example, in a data table, and communicated to an intelligence module 212.

The intelligence module 212, corresponding to the intelligence module 212 of FIG. 2, may store the determined language structure fields in database 230, corresponding to database 230 of FIG. 2, based on the API operations each determined language structure field or API schema field is associated with. The intelligence module 212 may also update the determined language structure fields in database 230 based on changes made to the mapping of language structure fields mapped to schema fields. Determined language structure fields may be communicated to the mock data generation module 214 as required for generating mock data corresponding to determined language structure fields. For example, mock data generation module 214 may generate a mock data set for an API under test, an API operation under test, API interaction command under test. API interaction commands may include requests made to an API, such as POST, GET, etc. API operations may be functions that an API provides in response to API interaction commands. In response to the requirement to generate a mock data set, the mock data generation module 214 may query the intelligence module 212 for determined language structure fields relevant to the API operation being tested. The intelligence module 212 may communicate the determined language structure fields relevant to the API operation being tested to the mock data generation module 214 which may generate a mock data set for the determined language structure fields. In this manner, embodiments are configured to determine a determined language structure field based on a mapping of the first language structure field to the first API schema field.

The mock data generation module 214, corresponding to the mock data generation module 214 of FIG. 2, may generate a mock data set for the determined language structure fields upon receiving the determined language structure fields relevant to the API operation being tested. In embodiments, a mock data set may be generated by the mock data generation module 214 via data synthesis performed by a GAN. Data synthesis performed by a GAN may include a deep learning model including a generator model and a discriminator model. Data synthesis in GANs may be achieved through adversarial training, where the generator model learns to produce synthetic data samples by mimicking the distribution of real data, while the discriminator model learns to distinguish between real and synthetic data samples. If the discriminator model is unable to distinguish between real and synthetic data samples, synthetic data samples may be used to make up the mock data set. In this manner, embodiments are configured to generate a mock data set based on the determined language structure fields. The mock data generation module 214 may also be configured to generate a mock data set based on the determined language structure field excluding a second language structure field and a second API schema field, as excluded by the mapped field identification module 210. In embodiments, a mock data set may be generated by the mock data generation module 214 via data synthesis performed by a GAN including generating mock data based on the determined language structure field comprising metadata associated with the first language structure field and the first API schema field. For example, a first language structure field mapped to a first API schema field may include metadata associated with a maximum number of characters permitted as input into either field. The mock data generation module 214 may generate a mock data set including mock data having a maximum character limit equal to that of a maximum number of characters permitted as input into the language structure field and API schema field.

Figure 4:
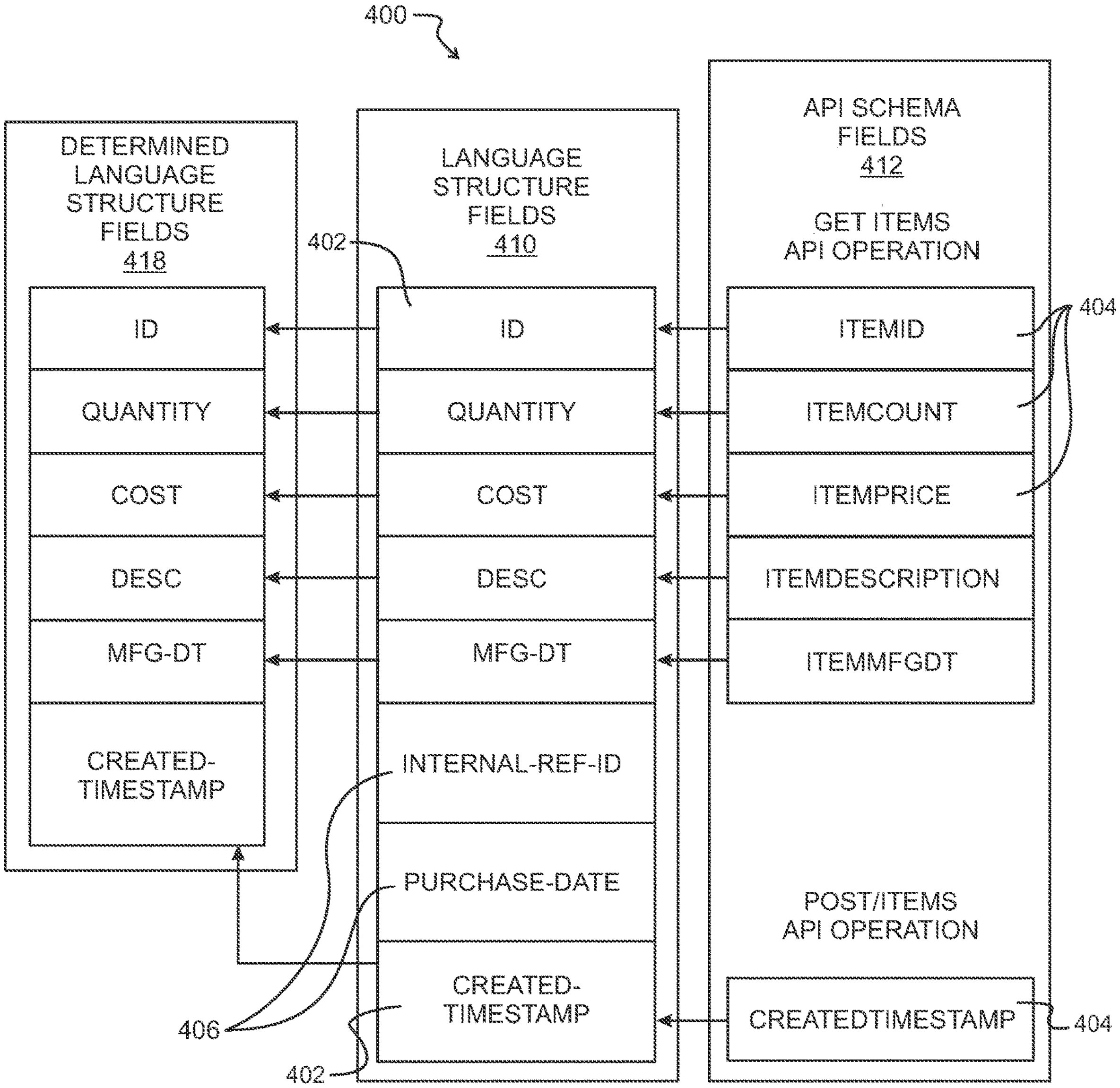
FIG. 4 shows a block diagram of an exemplary method in accordance with aspects of the present invention.

FIG. 4 shows a block diagram of an exemplary method 400 in accordance with aspects of the present invention. The steps of the method may be carried out in the environments of FIGS. 2 and 3 and are described with reference to elements depicted in FIG. 2 and FIG. 3. An API integration tool, such as API integration tool 302 of FIG. 3, may include a plurality of possible API schema fields 412 correlating to an individual API operation. The API integration tool may also include language structure fields 410 including all possible language structures 402 for any type of API, wherein the language structures 402 correspond to language structures 312 of FIG. 3. API schema fields 412 may be stored in a table or database, such as database 230 of FIGS. 2 and 3.

An API under test may include API schema 404 corresponding to API schema 310 of FIG. 3. Different API operations may each have a plurality of possible API schema fields 412 containing API schema 404 specific to an API operation. The mapped field identification module 210 of FIGS. 2, and 3 may compare API operations to language structure fields 410 mapped to schema fields 412 to identify similarities. Language structure fields 410 that are mapped to API schema fields 412 may indicate the API operation associated with the API schema fields. In embodiments, identifying a language structure field and an API schema field may be based on mappings of API schema fields 412 to language structure fields 410 as performed by the intelligence module 212 of FIGS. 2 and 3.

Language structure fields 410 may include language structures 402 corresponding to language structures 312 of FIG. 3. Language structure fields 410 may also include unmapped language structures 406 that are not mapped to an API schema 404. As an example, mapping maps API schema fields 412 such as "ITEMID," "ITEMCOUNT," "ITEMPRICE," "ITEMDESCRIPTION," ITEMMFGDT," and "CREATEDTIMESTAMP" to language structure fields 410 such as "ID," "QUANTITY," "COST," "DESC," "MFGDT," and "CREATED-TIMESTAMP," respectively. The plurality of language structure fields 410 and the plurality of API schema fields 412 may be stored, for example, within database 230 of FIG. 2, corresponding to remote server 104 or remote database 130 of FIG. 1.

Mapping may include integrating data from multiple sources, such as language structure fields 410 and API schema fields 412, into a single or unified data set by associating fields with specific attributes or shared or similar characteristics. Mapping may include aligning or merging language structure fields 410 and API schema fields 412 and resolving inconsistencies between the two. Mapping may also include transforming language structure fields 410 and API schema fields 412 into similar or identical formats. In this manner, embodiments may be configured to map a first language structure field to a first API schema field. In embodiments, mapping of API schema fields 412 to language structures fields 410 may include excluding the mapping of language structure fields not required by an API schema field corresponding to a particular API operation, such as unmapped language structures 406. In embodiments, determined language structure fields 418 may be identified for a mock data set based on the mapping of the mappings per API operation. Determined language structure fields 418 may be a subset of the language structures fields 410, including language structures 402, based on the mapping of API schema 404 to language structures 402. That is, embodiments may be configured to determine determined language structure fields 418 based on the mapping of language structure fields 410 to API schema fields 412.

Determining the determined language structure fields 418 may include identifying which language structure fields 402 have been mapped to API schema 404, or vice versa, per individual API operation, and compiling data fields matching those of the language structure fields 410 that have been mapped to API schema fields 412, or vice versa. Determined language structure fields 418 may be compiled, for example, in a data table, and communicated to the intelligence module 212 of FIGS. 2 and 3. The intelligence module 212 may communicate determined language structure fields 418 to the mock data generation module 214 to generate a mock data set based on the determined language structure fields 418.

Figure 5:
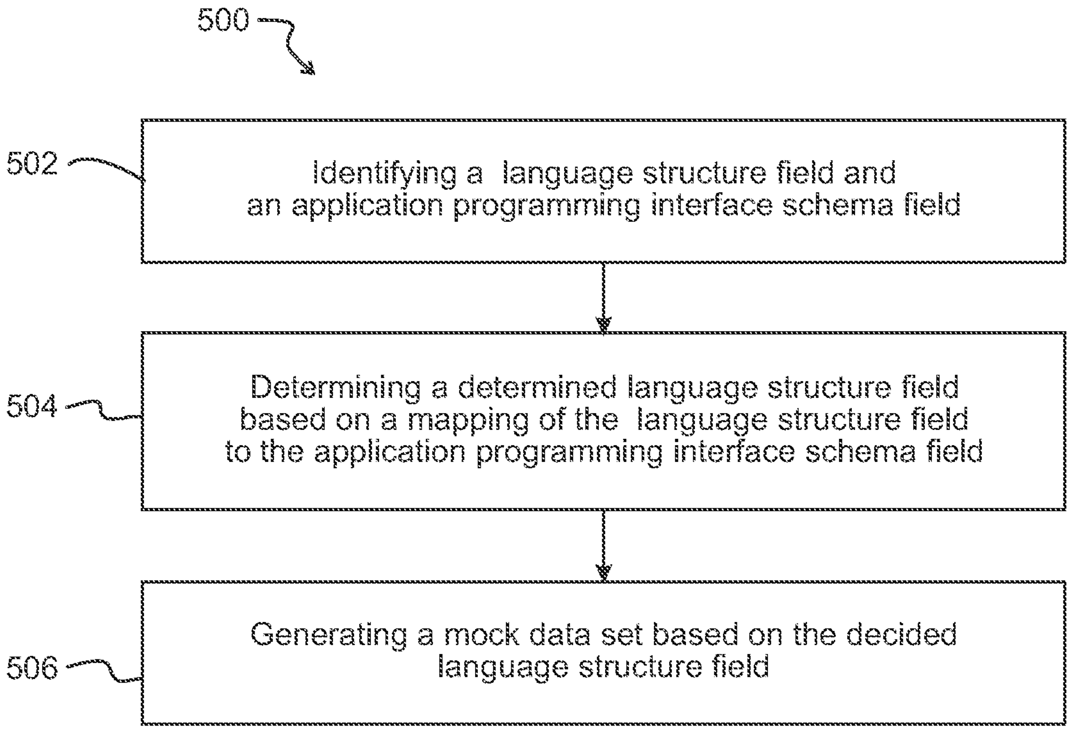
FIG. 5 shows a flowchart of an exemplary method in accordance with aspects of the present invention.

FIG. 5 shows a flowchart 500 of an exemplary method in accordance with aspects of the present invention. In step 502, the method may include: identifying a first language structure field and a first application programming interface schema field via the mapped field identification module 210 of FIGS. 2 and 3; determining a determined language structure field based on a mapping of the first language structure field to the first application programming interface schema field via the mapped field identification module 210 of FIGS. 2 and 3; and generating a mock data set based on the determined language structure field via the mock data generation module 214 of FIGS. 2 and 3.

In embodiments, a service provider could offer to perform the processes described herein. In this case, the service provider can create, maintain, deploy, support, etc., the computer infrastructure that performs the process steps in accordance with aspects of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, implementations provide a computer-implemented method, via a network. In this case, a computer infrastructure, such as computer 101 of FIG. 1, can be provided and one or more systems for performing the processes in accordance with aspects of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes in accordance with aspects of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

identifying, by a processor set, a language structure field and an application programming interface (API) schema field;

determining, by the processor set, the language structure field associated with an API under test based on a mapping of the language structure field to the API schema field, and selectively compiling data fields that correspond to the language structure field mapped to the API schema field;

updating, by the processor set, the determined language structure field in a database based on changes to the mapping between the language structure field and the API schema field;

generating, by the processor set, a mock data set based on the updated language structure field for testing the API under test; and communicating, by the processor set, the generated mock data set to the API under test for testing API operations, and receiving, from the API under test, a response corresponding to the communicated mock data set.

2. The computer-implemented method of claim 1, wherein the identifying comprises identifying the language structure field and the application programming interface schema field of an application programming interface operation.

3. The computer-implemented method of claim 1, wherein the identifying comprises identifying the language structure field from a plurality of language structure fields and identifying the application programming interface schema field from a plurality of application programming interface schema fields.

4. The computer-implemented method of claim 1, further comprising mapping the language structure field to the application programming interface schema field.

5. The computer-implemented method of claim 4, further comprising monitoring the mapping to identify an application programming interface operation associated with the language structure field or the application programming interface schema field.

6. The computer-implemented method of claim 1, wherein:

the language structure field comprises a first language structure field;

the API schema field comprises a first API schema field; and the determining comprises excluding a second language structure field and a second application programming interface schema field from the determined language structure field.

7. The computer-implemented method of claim 1, wherein:

the language structure field comprises a first language structure field;

the API schema field comprises a first API schema field; and the generating comprises generating the mock data set based on the determined language structure field comprising excluding a second language structure field and a second application programming interface schema field.

8. The computer-implemented method of claim 1, wherein the generating the mock data set based on the determined language structure field comprises generating the mock data set based on the determined language structure field comprising metadata associated with the language structure field and the application programming interface schema field.

9. The computer-implemented method of claim 1, wherein the generating the mock data set comprises data synthesis via a generative adversarial network.

10. A computer program product comprising one or more computer readable storage media having program instructions collectively stored on the one or more computer readable storage media, the program instructions executable to:

identify a language structure field and an application programming interface (API) schema field;

determine the language structure field associated with an API under test based on a mapping of the language structure field to the API schema field, and selectively compile data fields that correspond to the language structure field mapped to the API schema field;

update the determined language structure field in a database based on changes to the mapping between the language structure field and the API schema field;

generate a mock data set based on the updated language structure field for testing the API under test; and communicate the generated mock data set to the API under test for testing API operations, and obtain, from the API under test, a response corresponding to the communicated mock data set.

11. The computer program product of claim 10, wherein the identifying comprises identifying the language structure field and the application programming interface schema field of an application programming interface operation.

12. The computer program product of claim 10, wherein the identifying comprises identifying the language structure field from a plurality of language structure fields and identifying the application programming interface schema field from a plurality of application programming interface schema fields.

13. The computer program product of claim 10, wherein the program instructions are executable to:

map the language structure field to the application programming interface schema field.

14. The computer program product of claim 13, wherein the program instructions are executable to:

monitor the mapping to identify an application programming interface operation associated with the language structure field or the application programming interface schema field.

15. The computer program product of claim 10, wherein:

the language structure field comprises a first language structure field;

the API schema field comprises a first API schema field; and the determining comprises excluding a second language structure field and a second application programming interface schema field from the determined language structure field.

16. The computer program product of claim 10, wherein:

the language structure field comprises a first language structure field;

the API schema field comprises a first API schema field; and the generating comprises generating the mock data set based on the determined language structure field comprising excluding a second language structure field and a second application programming interface schema field.

17. The computer program product of claim 10, wherein the generating the mock data set based on the determined language structure field comprises generating the mock data set based on the determined language structure field comprising metadata associated with the language structure field and the application programming interface schema field.

18. The computer program product of claim 10, wherein the generating the mock data set comprises data synthesis via a generative adversarial network.

19. A system comprising:

a processor set, one or more computer readable storage media, and program instructions collectively stored on the one or more computer readable storage media, the program instructions executable to:

identify a language structure field and an application programming interface (API) schema field;

determine the language structure field associated with an API under test based on a mapping of the language structure field to the API schema field, and selectively compile data fields that correspond to the language structure field mapped to the API schema field;

update the determined language structure field in a database based on changes to the mapping between the language structure field and the API schema field;

generate a mock data set based on the updated language structure field for testing the API under test; and communicate the generated mock data set to the API under test for testing API operations, and receive, from the API under test, a response corresponding to the communicated mock data set.

20. The system of claim 19, wherein:

the language structure field comprises a first language structure field;

the API schema field comprises a first API schema field; and the determining comprises excluding a second language structure field and a second application programming interface schema field from the determined language structure field.

* * * * *